United States Patent
Lawler et al.

(10) Patent No.: US 9,807,047 B2
(45) Date of Patent: *Oct. 31, 2017

(54) METHODS AND APPARATUS FOR TARGETING COMMUNICATIONS USING SOCIAL NETWORK METRICS

(71) Applicant: LinkedIn Corporation, Mountain View, CA (US)

(72) Inventors: Brian Lawler, San Francisco, CA (US); Elliot Loh, San Francisco, CA (US); Paul J. Martino, Mountain View, CA (US); Mark Pincus, San Francisco, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/235,367

(22) Filed: Aug. 12, 2016

(65) Prior Publication Data

US 2016/0352670 A1    Dec. 1, 2016

Related U.S. Application Data

(63) Continuation of application No. 14/504,043, filed on Oct. 1, 2014, now Pat. No. 9,442,988, which is a
(Continued)

(51) Int. Cl.
*G06F 15/16* (2006.01)
*H04L 12/58* (2006.01)
(Continued)

(52) U.S. Cl.
CPC ............ *H04L 51/26* (2013.01); *G06F 3/0481* (2013.01); *G06F 17/3053* (2013.01);
(Continued)

(58) Field of Classification Search
CPC ....................................................... G06Q 10/10
(Continued)

(56) References Cited

U.S. PATENT DOCUMENTS

| 6,112,181 A | 8/2000 | Shear et al. |
| 6,134,566 A | 10/2000 | Berman et al. |

(Continued)

FOREIGN PATENT DOCUMENTS

EP    1288795 A1    3/2003

OTHER PUBLICATIONS

"U.S. Appl. No. 14/494,938, Preliminary Amendment filed Sep. 25, 2014", 9 pgs.
(Continued)

*Primary Examiner* — Shripal Khajuria
(74) *Attorney, Agent, or Firm* — Schwegman Lundberg & Woessner, P.A.

(57) ABSTRACT

A method for a computer system includes receiving a first user communication, determining a first group of users, determining a target number of users, determining whether the first group of users includes the target number of users, and if not, providing the communication to the first group of users, determining a hierarchal mapping of groups of users in response to user memberships, determining a second group of users from the hierarchal mapping, determining a plurality of social network relationship factors for the second group of users with respect to the first user, and providing the communication to at least a subset of users in the second group of users in response to the first plurality of social network relationship factors.

25 Claims, 5 Drawing Sheets

Related U.S. Application Data continuation of application No. 14/087,415, filed on Nov. 22, 2013, now Pat. No. 9,160,774, which is a continuation of application No. 11/102,570, filed on Apr. 7, 2005, now Pat. No. 8,682,995.

(60) Provisional application No. 60/560,468, filed on Apr. 7, 2004, provisional application No. 60/560,414, filed on Apr. 7, 2004, provisional application No. 60/570,911, filed on May 12, 2004.

(51) Int. Cl.
| | | |
|---|---|---|
| *G06Q 10/10* | (2012.01) | |
| *G06Q 20/14* | (2012.01) | |
| *H04L 12/18* | (2006.01) | |
| *G06F 17/30* | (2006.01) | |
| *G06F 3/0481* | (2013.01) | |
| *H04L 29/06* | (2006.01) | |

(52) U.S. Cl.
CPC .. *G06F 17/30598* (2013.01); *G06F 17/30867* (2013.01); *G06Q 10/10* (2013.01); *G06Q 20/145* (2013.01); *H04L 12/1813* (2013.01); *H04L 51/046* (2013.01); *H04L 51/12* (2013.01); *H04L 51/32* (2013.01); *H04L 65/403* (2013.01)

(58) Field of Classification Search
USPC .......................................................... 709/207
See application file for complete search history.

(56) References Cited

U.S. PATENT DOCUMENTS

| | | |
|---|---|---|
| 6,175,831 B1 | 1/2001 | Weinreich et al. |
| 6,295,526 B1 | 9/2001 | Kreiner et al. |
| 6,405,035 B1 | 6/2002 | Singh et al. |
| 6,622,147 B1 | 9/2003 | Smiga et al. |
| 6,745,196 B1 | 6/2004 | Colyer et al. |
| 6,868,389 B1 | 3/2005 | Wilkins et al. |
| 7,069,308 B2 | 6/2006 | Abrams |
| 7,113,917 B2 | 9/2006 | Jacobi et al. |
| 7,167,910 B2 | 1/2007 | Farnham et al. |
| 7,177,880 B2 | 2/2007 | Ruvolo et al. |
| 7,275,102 B2 | 9/2007 | Yeager et al. |
| 7,289,965 B1 | 10/2007 | Bradley et al. |
| 7,318,037 B2 | 1/2008 | Solari |
| 8,682,995 B1 | 3/2014 | Lawler et al. |
| 9,442,988 B2 | 9/2016 | Lawler et al. |
| 2001/0014868 A1 | 8/2001 | Herz et al. |
| 2002/0071546 A1 | 6/2002 | Brennan et al. |
| 2002/0126140 A1 | 9/2002 | Gorbet et al. |
| 2002/0138289 A1 | 9/2002 | Thielges et al. |
| 2002/0178161 A1 | 11/2002 | Brezin et al. |
| 2003/0028596 A1 | 2/2003 | Toyota |
| 2003/0046097 A1 | 3/2003 | LaSalle et al. |
| 2003/0050977 A1 | 3/2003 | Puthenkulam et al. |
| 2003/0158855 A1 | 8/2003 | Farnham et al. |
| 2003/0167324 A1 | 9/2003 | Farnham et al. |
| 2003/0200112 A1 | 10/2003 | Royall, Jr. et al. |
| 2003/0216986 A1 | 11/2003 | Hassan |
| 2004/0167794 A1 | 8/2004 | Shostack et al. |
| 2005/0021750 A1 | 1/2005 | Abrams |
| 2005/0076241 A1 | 4/2005 | Appelman |
| 2005/0131884 A1 | 6/2005 | Gross et al. |
| 2005/0149622 A1 | 7/2005 | Kirkland et al. |
| 2005/0210102 A1 | 9/2005 | Johnson et al. |
| 2005/0256866 A1 | 11/2005 | Lu et al. |
| 2006/0167864 A1 | 7/2006 | Bailey et al. |
| 2007/0088614 A1 | 4/2007 | Huo |

OTHER PUBLICATIONS

"U.S. Appl. No. 14/495,004, Preliminary Amendment filed Sep. 25, 2014", 8 pgs.

"U.S. Appl. No. 14/495,050, Preliminary Amendment filed Sep. 25, 2014", 8 pgs.

"U.S. Appl. No. 14/495,086, Preliminary Amendment filed Sep. 25, 2014", 7 pgs.

"Secure Business Intelligence with Brio Enterprise", Meeting user's need for flexible data access, while providing robust security with Brio Enterprise 5.5, Brio Technology, [Online]. Retrieved from the Internet: <http://www.gtech.com.tr/Kutuphane/Secure_Business_Intelligence_with_Brio_Enterprises.pdf>, (Nov. 1998), 20 pgs.

Balabanovic, et al., "Content-Based, Collaborative Recommendation", ACM, vol. 40, No. 3, (Mar. 1997), 66-72.

Fahl, Gustov, et al., "Query processing over object views of relational data", The VLDB Journal 6, (1997), 261-281.

Kautz, et al., "Combining Social Networks and Collaborative Filtering", vol. 40, No. 3, (Mar. 1997), 63-65.

Lawler, Brian, et al., "Communication Systems and Methods with Social Network Filtering", U.S. Appl. No. 11/102,569, filed Apr. 7, 2005, 43 pgs.

Lawler, Brian, et al., "Communication Systems and Methods with Social Network Filtering", U.S. Appl. No. 12/913,197, filed Oct. 27, 2010, 59 pgs.

Lawler, Brian, et al., "Methods and Apparatus for Integrating Social Network Metrics and Reputation Data", U.S. Appl. No. 11/102,573, filed Apr. 7, 2005, 38 pgs.

Martino, Paul J, et al., "Dynamic Social Network Relationship Determination Method and Apparatus", U.S. Appl. No. 11/123,854, filed May 6, 2005, 43 pgs.

Schafer, et al., "Recommender systems in E-Commerce", ACM, Proceedings of the 1st ACM conference on Electronic Commerce, (1999), 158-166.

"U.S. Appl. No. 11/102,570, Applicant Initiated Interview Summary dated Aug. 16, 2011", 3 pgs.

"U.S. Appl. No. 11/102,570, Final Office Action dated Feb. 5, 2013", 17 pgs.

"U.S. Appl. No. 11/102,570 Final Office Action dated Feb. 9, 2010", 20 pgs.

"U.S. Appl. No. 11/102,570, Final Office Action dated Mar. 15, 2011", p pgs.

"U.S. Appl. No. 11/102,570, Non Final Office Action dated Jun. 26, 2012", 14 pgs.

"U.S. Appl. No. 11/102,570, Non Final Office Action dated Jul. 3, 2008", 14 pgs.

"U.S. Appl. No. 11/102,570, Non Final Office Action dated Aug. 19, 2010", 19 pgs.

"U.S. Appl. No. 11/102,570, Notice of Allowance dated Aug. 21, 2013", 10 pgs.

"U.S. Appl. No. 11/102,570, Response filed Apr. 3, 2009 to Final Office Action dated Jan. 5, 2009", 14 pgs.

"U.S. Appl. No. 11/102,570, Response filed May 10, 2010 to Final Office Action dated Feb. 9, 2010", 16 pgs.

"U.S. Appl. No. 11/102,570, Response filed Jul. 30, 2013 to Final Office Action dated Feb. 5, 2013", 10 pgs.

"U.S. Appl. No. 11/102,570, Response filed Aug. 12, 2011 to Final Office Action dated Mar. 15, 2011", 12 pgs.

"U.S. Appl. No. 11/102,570, Response filed Sep. 4, 2009 to Non Final Office Action dated Jun. 8, 2009", 16 pgs.

"U.S. Appl. No. 11/102,570, Response filed Oct. 3, 2008 to Non Final Office Action dated Jul. 3, 2008", 15 pgs.

"U.S. Appl. No. 11/102,570, Response filed Oct. 25, 2012 to Non Final Office Action dated Jun. 26, 2012", 8 pgs.

"U.S. Appl. No. 11/102,570, Response filed Dec. 20, 2010 to Non Final Office Action dated Aug. 19, 2010", 8 pgs.

"U.S. Appl. No. 11/102,570, Final Office Action dated Jan. 5, 2009", 17 pgs.

"Application Serial No. Non Final Office Action dated Jun. 8, 2009", 18 pgs.

Lawler, Brian, et al., "Social Network Augmentation of Search Results Methods and Apparatus", U.S. Appl. No. 11/222,685, filed Sep. 8, 2005, 42 pgs.

Lawler, Brian, et al., "Social Network Filtering of Search Results Methods and Apparatus", U.S. Appl. No. 11/223,452, filed Sep. 8, 2005, 38 pgs.

(56) References Cited

OTHER PUBLICATIONS

Martino, Paul, et al., "Dynamic Social Network Relationship Determination Methods and Apparatus", U.S. Appl. No. 11/221,573, filed Sep. 7, 2005, 42 pgs.
Martino, Paul, et al., "Methods and Apparatus for Determining Social Relevance in Near Constant Time", U.S. Appl. No. 11/123,853, filed May 5, 2005, 38 pgs.
Martino, Paul, et al., "Methods and Apparatus for Redetermining Social Maps Upon Expectation of Change", U.S. Appl. No. 11/123,844, filed May 6, 2005, 37 pgs.

METHODS AND APPARATUS FOR TARGETING COMMUNICATIONS USING SOCIAL NETWORK METRICS

CROSS REFERENCE TO RELATED APPLICATIONS

This application is a continuation of U.S. patent application Ser. No. 14/504,043, filed Oct. 1, 2014, which is a continuation of U.S. patent application Ser. No. 14/087,415, filed Nov. 22, 2013 and issued on Oct. 13, 2015 as U.S. Pat. No. 9,160,774, which is a continuation of U.S. patent application Ser. No. 11/102,570, filed Apr. 7, 2005 and issued on Mar. 25, 2014 as U.S. Pat. No. 8,682,995, which in turn claims priority to Provisional Application No. 60/560,468, filed Apr. 7, 2004, Provisional Application No. 60/560,414, filed Apr. 7, 2004, and Provisional Application No. 60/570,911, filed May 12, 2004, all of which applications are incorporated herein by reference in their entirety.

BACKGROUND

The present invention relates to trust-metric networks. More specifically, the present invention relates to prioritizing communications via trust-metrics methods and apparatus.

With the wide-spread use of computers, cell phones, PDAs, and the like, it has become easier for people to communicate with each other. As a result, more parents call children, more friends chat over 1M with other friends, more business send e-mail to other businesses, and the like. Unfortunately, this also results in people making and receiving calls from "wrong numbers," businesses making unsolicited calls to people, often at dinner time, businesses and individuals receiving "spam" e-mail, and the like. In the past several years, unsolicited communications have become more burdensome to recipients.

To address such problems, regulations have been passed to attempt to reduce the amount of unwanted communication. For example, telemarketing laws have been passed to allow consumers to opt-out of cold-call lists via use of a national telephone registry. As another example, federal and state spam laws have been passed to allow consumers and businesses to request "removal" from unsolicited e-mail mailing lists.

These regulations have only been somewhat effective. For every regulation, there are work-arounds. For example, telemarketing laws do not appear to cover telemarketers outside the US, and I or telemarketers making VOIP calls. As another example, e-mail spammers with overseas servers are beyond enforcement jurisdiction.

The problem with unwanted communications is now being extended to new forms of communication, including IM-type chat, SMS, data feeds, pop-up web windows, and the like.

For businesses and individuals who send out "legitimate" communications or communications that should be of interest to recipients, there is a similar problem. More specifically, how to accurately target communications to recipients. Most legitimate businesses, or the like often desire not to send out "spam," as it tends to reduce the businesses good will and reputation. Additionally, their money is wasted by paying to send out communications to disinterested parties.

One solution for those who send out communications has been via keyword purchasing of search results. As is common with search engines such as Google, Yahoo, MSN, and the like, any number of "sponsored" ads may appear as a search result. For example, searching on the term "Vioxx" currently leads to a number of results related to personal injury lawyers. As can be seen, such results are not desired by individuals searching for chemical structure of Vioxx or those interested in clinical research of Vioxx, for example.

Accordingly, in light of the above, what is desired are methods and apparatus that target communications to recipients without the drawbacks, as discussed above.

BRIEF SUMMARY OF THE INVENTION

The present invention relates to trust-metric networks. More specifically, the present invention relates to prioritizing communications via trust-metrics methods and apparatus.

In embodiments of the present invention, different ways to restrict the sending of e-mail messages, invitations, chat messages, and the like; and different ways to filter-out and/or prioritize received e-mail messages, invitations, chat messages, and the like are disclosed. For example, as will be described below, users who send e-mail messages may leverage the relationships of the social network to target users using specified criteria. Further, as will be described below, users who receive e-mail messages may also leverage the relationships of the social network to prioritize, limit or expand the number of e-mail messages that enter a user's inbox.

According to one aspect of the invention, a method for a computer system is described. One technique includes receiving a communication from a first user, determining a first group of users in response to input from the first user, receiving a specification of a target number of users to receive the communication, and determining whether a number of users in the first group of users is greater than to the target number of users. In various processes, when the number is not greater than the target number, the process may also include providing the communication to the users from the first group of users, determining an additional number of users in response to the number and the target number, determining a tribe mapping comprising a plurality of groups of users in a hierarchal relationship in response to user memberships in the plurality of groups, determining a second group of users in the tribe mapping in response to the first group of users, wherein the second group of users is adjacent to the first group of users in the hierarchal relationship, determining a first plurality of social network relationship factors for the second group of users with respect to the first user, and providing the communication to the additional number of users in the second group of users in response to the first plurality of social network relationship factors.

According to another aspect of the invention, a computer system is described. One apparatus includes a memory configured to store a plurality of social distances between a plurality of users. Other systems include a processor coupled to the memory, wherein the processor is configured to receive a communication from a first user, wherein the processor is configured to determine a first group of users, wherein the processor is configured to receive a specification of a target number of users to receive the communication, wherein the processor is configured to determine whether a number of users in the first group of users is greater than to the target number of users. Other apparatus include, a processor, when the number is not greater than the target number the processor is configured to provide the communication to the users from the first group of users, determine an additional number of users in response to the number and the target number, determine a hierarchal mapping of a plurality of groups of users in response to user memberships in the plurality of groups, determine a second group of users in the hierarchal mapping in response to the first group of users, wherein the second group of users is adjacent to the first group of users in the hierarchal relationship, determine a first plurality of social network relationship factors for the second group of users with respect to the first user, and provide the communication to the additional number of users in the second group of users in response to the first plurality of social network relationship factors.

According to yet another aspect of the invention, a computer program product for a computer system including a processor is described. The computer program product may include code that directs the processor to receive a communication from a first user, code that directs the processor to determine a hierarchal mapping of a plurality of groups of users in response to user memberships in the plurality of groups, and code that directs the processor to determine a first group of users in response to input from the first user and in response to the hierarchal mapping. Additional computer program products may include code that directs the processor to receive a specification of a target number of users to receive the communication, code that directs the processor to determine whether a number of users in the first group of users is greater than to the target number of users, and code that directs the processor to determine a second group of users in the hierarchal mapping in response to the first group of users, when the number is not greater than the target number. Other computer program products may also include code that directs the processor to provide the communication to the users from the first group of users, when the number is not greater than the target number, and code that directs the processor to provide the communication to users from the second group of users, when the number is not greater than the target number. The codes may reside on a tangible media such as optical media (e.g. CD, DVD), magnetic media (e.g. hard disk), semiconductor media (e.g. RAM), or the like.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION

Figure 1:
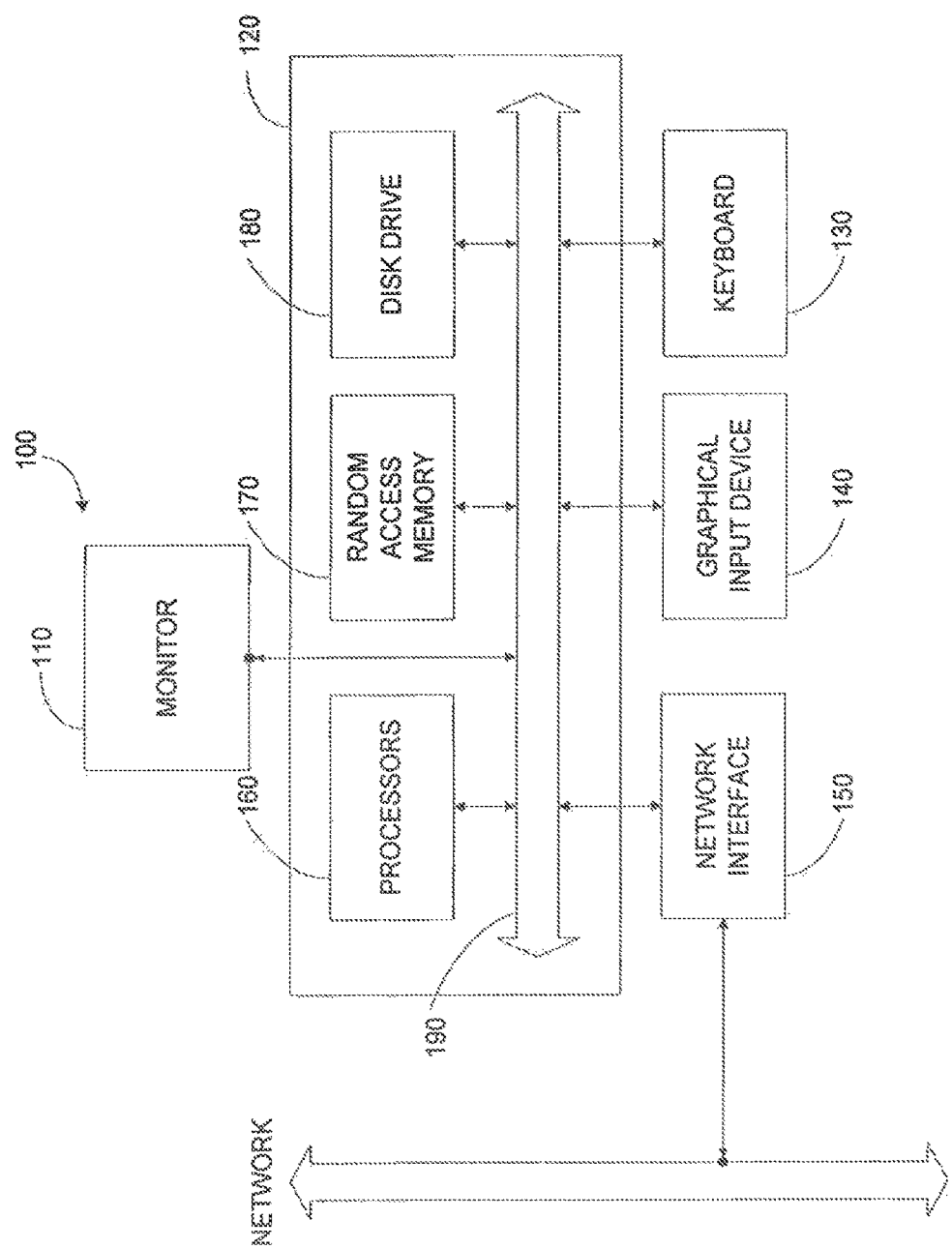
FIG. 1 illustrates a block diagram according to an embodiment of the present invention.

The following definitions are used in the present application to describe embodiments of trust-metric networks. That is, networks of users (e.g. persons, businesses) that have relationships between them that specify or imply a measure of trust or bond between users. The following terms are particularly relevant for social network embodiments.

Communications—Any type of communication by one user that is viewed or received by another user including e-mail, telephone call, instant messaging, short message service message, IRC message, forum postings, blog postings, invitations.

Home page—Typically the first page presented to a user when the user logs into the social network. Home pages may or may not be customized for each user.

People Card—A profile page associated with a user. A profile page typically includes a description of information provided by the user and retrievable by other users/viewers. This may include a name, contact information, a list of immediate friends, a list of interests, a list of affinity groups the user is a member of, job title, employer, and the like. In embodiments of the present invention, the amount of information displayed to a user/viewer may vary according to any number of parameters. Users may, for example specify the amount of user information viewable to other users depending upon metrics between the user and the other users. As examples, the user may provide a first e-mail address to users at a close social distance (defined below) (e.g. 1), and a second e-mail address to users farther away; the user may provide their full name to users less than a social distance of 2.0, but only their first name to other users; the user may allow users closer-than a social distance of 3.2, to view a photo album, but the photo album is hidden to distant users; and the like.

In the various embodiments, users may have full control of what type of information they provide, according to their relationships in the social network. In some embodiments, there is a default relationship between the type of information provided about a user with respect to their relationships (e.g. social distance). The default relationships may be overridden by the user.

In various embodiments, users may have one or more profiles, for example, a profile for an alumni affinity group, a profile for their business, a profile for close friends. In various embodiments, different profiles may include different types of information about the user.

Degrees of Social Separation—A value defined as immediate friends (or acquaintances) of a user being a first degree; friends of the user's immediate friends being a second degree; etc. Degrees of Social Separation may also be computed relative to affinity groups, with members of the same affinity group being a first degree; members of directly related affinity groups being a second degree; etc. Degrees of social separation may also refer to a combination of relationships or ties between friends and relationships or ties between members of affinity groups.

In various embodiments, the degree of social separation between different users may be different depending upon which metric for separation distances are used, and depending upon the context in which the separation distance is to be used. Additionally, users may have different social separations for different user profiles. For example, two users may have a large social separation when considering personal profiles, but a small social separation when considering membership profiles in affinity groups. In some embodiments, the social distance may be the shortest distance between a first user and a second user.

Social distance—A numeric value associated with the Degrees of Social Separation between a first user and a second user. In embodiments of the present invention, a smaller social distance between users represents a higher "trust" level between the users. For example, in many cases, a user will trust her immediate friends (social distance=1); however, a user will trust a friend of her immediate friend (social distance=2) to a smaller degree; and a user will trust a friend of a friend of her immediate friend (social distance=3) even less; and so on. In various embodiments, social distance need not be an integral value and may be a floating point number, for example social distance=4.2, social distance=1.5, etc. In such embodiments, other weighting factors other than mere degree of social separation may be considered, such as "importance" of the relationships between the users, the frequency of communications between the users, the quality of business relationship between the users, and the like. Other types of "fuzzy" weighting factors may include frequency of communication between users, common posts to similar forums, and the like, as will be described below.

In embodiments of the present invention, social distance may be symmetric or asymmetric numbers. As an example of this, a social distance between user A and user B may be the same (e.g. 1.4), when both user A and user B value their relationship the same. However, if user A values the relationship more than user B, the social distance from user B to user A may be smaller (e.g. 1.3) than from user A to user B (e.g. 1.8). Some of the factors described above may be used to determine weighting of the relationships, including user satisfaction of prior interactions, responsiveness to correspondences or queries, performance, common interests, common posting forum, a "frequency" factor, and the like.

In various embodiments, frequency factors may be based upon the number (or percentage) of contacts between two users. For example, the more frequently the two users exchange messages, the more heavily weighted is the frequency factor for the two users. These frequency factors may result in non-integer social distances. In various embodiments, an assumption is made that users who communicate frequently may be closer better friends. For example, user A has a social distance of 1.3 from user B, and user B frequently communicates with user C, but not user D. Accordingly, in one embodiment, the computed social distance between user A and user C may be 1.9 which would be smaller than the social distance between user A and user D which may be 2.4.

As is described in the above-referenced provisional application, in embodiments of the present invention, the social map of a user may be computed in real time or near real-time, when the user logs into the social network.

In various embodiments, relationship weighting factors may be manually entered by the user. For example, user A may rate a concluded transaction between user A and user B; user B may rate the timeliness of user A payment speed; and the like. In alternative embodiments, the relationship weighting factors may automatically be determined. For example, the frequency of communications between users may indicate a more valued relationship between the users, accordingly, the social distance between users may be shortened. In other examples, the more frequently two users post messages to an affinity group forum or post messages on the same thread in the forum, the higher their weighting factor relative to each other. In such embodiments automatically increasing weighting factors between the users is useful because it infers that users have shared interests. Other types of inferences based on user behavior are contemplated in other embodiments.

In other embodiments, users can decrease their social distance to other users by their own actions. For example, by quickly responding to e-mail messages, or other communications, responsiveness weighting factor of a user may be increased; as another example, frequency of checking e-mail messages or logging into the social network, or the like may increase a responsiveness factor. As an example, if a user runs a business using the social network, by increasing her quality of service, and client satisfaction, her reputation factor may increase. Accordingly, social distances of users relative to the business in the social network may automatically decrease, because of her increased reputation.

Tribe—An affinity group. One example is similar to a Usenet group, having a user moderator, user participants, discussion forums, etc.; whereas in other examples, an affinity group need not have a moderator, leader, or the like. In embodiments of the present invention, two users may be connected in the social network by being members of the same affinity group, even though the two users may otherwise have a large social distance between them.

In various embodiments of the present invention, Tribe membership may be explicitly defined or implicitly defined. Accordingly, Implied Tribes may be determined. These tribes are groupings of users based on a common interest, common activity, or any other type of trait held by two or more users, without an explicit definition. Examples of implied tribes may include users who list a common interest, such as "skiing," users who view a particular classified listing, restaurant review, or the like.

In some embodiments of the present invention, members of affinity groups or groups of users are logically organized as one user (super node). In such embodiments, relationships of members are collapsed and imputed to the affinity group. For example, a clique of three close friends may be considered a super node, for sake of simplicity when performing relationship computations. The relationships of the super node may include the relationships of its underlying users. For example, a ski Utah affinity group may have users A, B, and C, thus the ski Utah affinity group super node will have the affinity relationships of its Users A, R, and C. Accordingly, affinity groups can have social distances from other affinity groups. In another example, the ski Utah affinity group will combine the personal relationships of its users A, B, and C. In various embodiments, for this example, the ski Utah affinity group will list both the ski Utah affinity group relationships and the ski Utah affinity group personal relationships side-by-side. These relationships may be represented by a graph, or as desired. In other embodiments, the relationships of the affinity group are expanded and imputed back to the members of the affinity group.

Tribe Mapping—A process of determining a bottom-up taxonomy for related tribes based on common user membership overlap. These maps may be computed based upon explicit tribe membership data, or implicit tribe membership, as described above. For example, if 75% of the users in a bird-watching tribe also view communications on spotting scopes, a tribe mapping may closely associate the bird-watching tribe with an implied spotting-scope tribe. As another example, a "San Francisco Wine Drinker" tribe will most likely have a significant overlap with a "San Francisco" tribe, and a "Wine Drinker" tribe. This mapping can be performed automatically through algorithms that compute similarity, or manually by moderators of the tribes, who explicitly state their relationship. Additionally, determining a Tribe Map may be performed on demand. Accordingly, overlap of affinity groups may be explicit or implicit. The relationship between tribes can then be used as part of a social network filter or affinity filter criteria, described further below.

User Network—A subset of all users on the social network. In embodiments of the present invention, a User Network may be socially limited to a specified social distance from the user and/or by affinity groups which the user is a member of. For example, a user network may include all users within a social distance (or affinity distance) of 3.5.

In other embodiments, the user network may constrain the type of information available to the user. As examples, users may be constrained to searching for information (e.g. job posts) from users only within their user network; users may be limited to sending e-mails or invitations, or chatting only with other users in their user network. Many other restrictions can be envisioned to be placed on users based upon their relationships in the social network.

Social Map—A map of connections to other users on the system. The Social map typically includes a shortest path between two users, either via friendship, affinity group, or the like. The social map is typically socially limited to a specified social distance from the user. In embodiments of the present invention, the limited distance may be specified by an administrator, the user, or the like.

Social Network—A network of relationships between users (via friendship, affinity, or the like).

People Web—A unified collection of social networks into a complete social map. Unifying identities across social networks allows one to traverse the social map in a way similar to DNS for network traffic.

FIG. 1 is a block diagram of typical computer system 100 according to an embodiment of the present invention.

In the present embodiment, computer system 100 typically includes a monitor 110, computer 120, a keyboard 130, a user input device 140, a network interface 150, and the like.

In the present embodiment, user input device 140 is typically embodied as a computer mouse, a trackball, a track pad, wireless remote, and the like. User input device 140 typically allows a user to select objects, icons, text and the like that appear on the monitor 110.

Embodiments of network interface 150 typically include an Ethernet card, a modem (telephone, satellite, cable, ISDN), (asynchronous) digital subscriber line (DSL) unit, and the like. Network interface 150 are typically coupled to a computer network as shown. In other embodiments, network interface 150 may be physically integrated on the motherboard of computer 120, may be a software program, such as soft DSL, or the like.

Computer 120 typically includes familiar computer components such as a processor 160, and memory storage devices, such as a random access memory (RAM) 170, disk drives 180, and system bus 190 interconnecting the above components.

In one embodiment, computer 120 is a PC compatible computer having one or more microprocessors from Intel Corporation, or the like. Further, in the present embodiment, computer 120 typically includes a UNIX-based operating system.

RAM 170 and disk drive 180 are examples of tangible media for storage of data, audio/video files, computer programs, user profile card data, user social network-related data, social distance computation programs, hierarchal posting data, social network filtering criteria, other embodiments of the present invention and the like. Other types of tangible media include magnetic storage media such as floppy disks, hard disks, removable hard disks; optical storage media such as CD-ROMS, DVDs, bar codes, holographic; semiconductor memories such as flash memories, read-only-memories (ROMS), volatile memories; networked storage devices; and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 is representative of computer rendering systems capable of embodying the present invention. It will be readily apparent to one of ordinary skill in the art that many other hardware and software configurations are suitable for use with the present invention. For example, the use of other microprocessors are contemplated, such as PentiumIV™ or Itanium™ microprocessors; AthlonXP™ microprocessors from Advanced Micro Devices, Inc; PowerPC G4™ G5™ microprocessors from Motorola, Inc.; and the like. Further, other types of operating systems are contemplated, such as Windows® operating systems (e.g. WindowsXP®, WindowsNT®, or the like) from Microsoft Corporation, Solaris from Sun Microsystems, LINUX, UNIX, MAC OS from Apple Computer Corporation, and the like.

Figure 2:
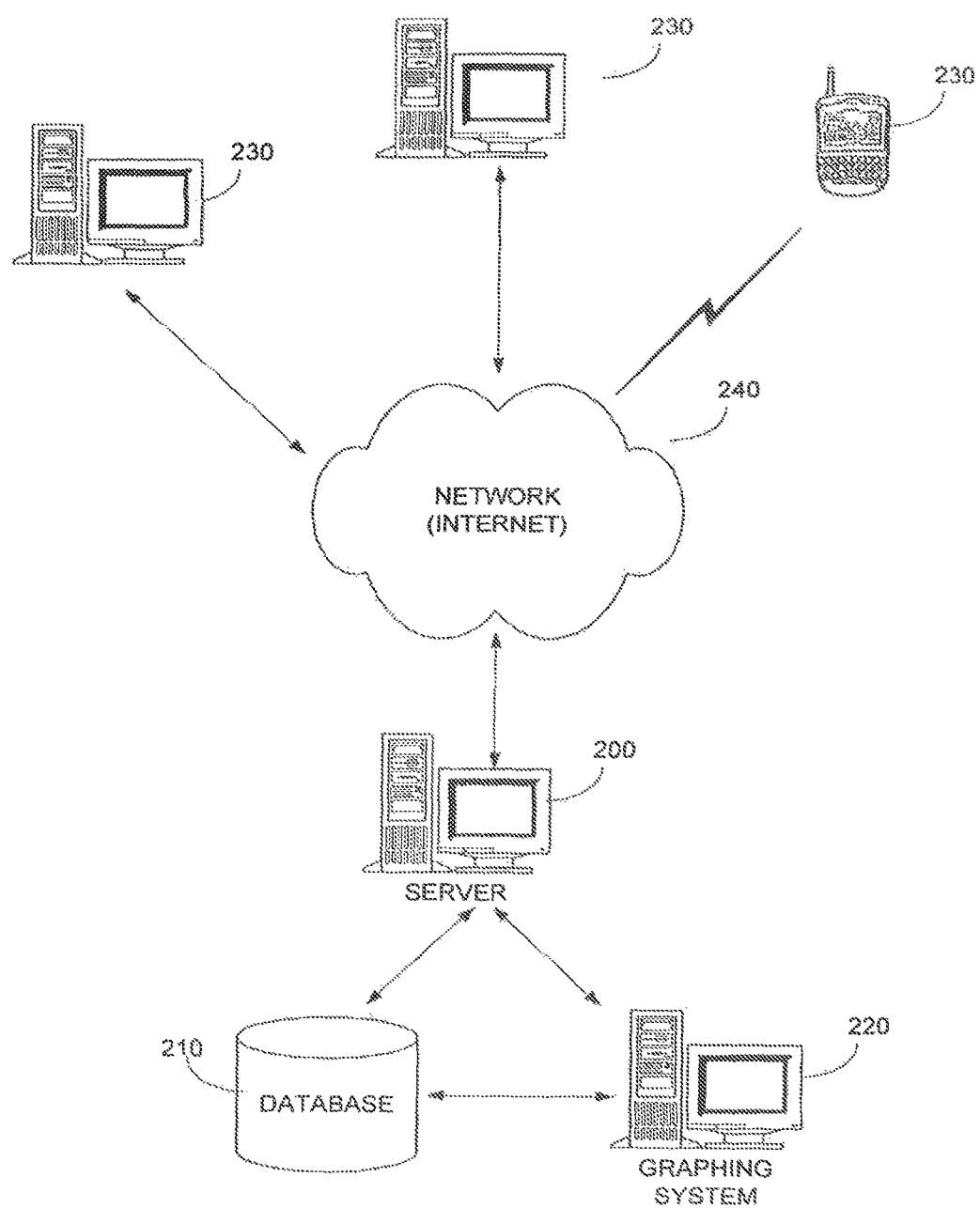
FIG. 2 illustrates another block diagram according to an embodiment of the present invention.

FIG. 2 illustrates another block diagram according to an embodiment of the present invention. FIG. 2 includes a server 200 coupled to a database 210 and coupled to a graphing system 220. A plurality of users 230 are coupled to server 200 via a network 240, such as the Internet.

In the present embodiments, users 230 may be any conventional access device, such as a computer, a web-enabled telephone, a personal digital assistant, or the like. In operation, users 230 log into server 200 and then makes one or more requests for data. The data that is returned is typically displayed back to user.

In various embodiments, server 200 may be embodied, as described above, and include one or more servers (e.g. server cluster) that respond to requests from users 230. For example, multiple servers may be used in embodiments where server performance is important, e.g. East Coast server for client requests from Boston, Midwest server for client requests from Chicago, and the like. Server 200 may be configured as illustrated in FIG. 1, above.

Database 210 may be any conventional database such as powered by MySQL, Oracle, Sybase, or the like. In other embodiments, database 210 may be any other data source such as an LDAP server, or the like. In the present embodiment, database 210 is configured to store and maintain user data, to store and maintain relationship data between the users, and configured to make changes to relationship data between users, among other functions. As illustrated, database 210 may be coupled to server 200 and to graphing system 220 to send and receive respective data, as will be described below.

In various embodiments, graphing system 220 is a standalone computer system configured to receive data from server 200, and configured to store and maintain relationship data between the users. Additionally, in various embodiments, graphing system 220 is configured to determine and provide requested relationship data to server 200. In various embodiments, graphing system 220 may be integrated as a part of server 200, or the like.

In various embodiments, graphing system 220 may be a conventional computer system, as described above. In one embodiment, graphing system 220 maintains in the relationship data of users (adjacency information) in RAM. In other embodiments of the present invention, graphing system 220 may store a portion of the relationship data of users in RAM. The other portions of the relationship data of users may be stored on magnetic disk or other media, on database 210, or the like. In such embodiments, elements of the relationship data of users can be loaded into a most recently used (MRU) queue.

In the present embodiment, graphing system 220 computes social relationships in real time by minimizing lookup time of required information. For example, lookup operations such as: who are the direct friends of person A?, who are the members of tribe B?, etc., are performed in constant or near constant time. Additionally, graphing system 220 stores relationship data for users in RAM in a way that allows explicit control over memory allocation. In some embodiments of the present invention, it is expected that graphing system 220 will be able to compute social distance computations on a social network of up to 20 million users, within 20 milliseconds or less.

In embodiments of the present invention, graphing system 220 may include a number (e.g. cluster) of individual systems. In various embodiments, the individual systems may store unique portions of the relationship data of users; the individual systems may store in parallel the same portions (or the entire) relationship data of users; or the like. Any traditional data clustering technique may be used to implement graphing system 220 in embodiments of the present invention.

Additionally, in embodiments, graphing system 220 determines the specific relationships (e.g. social distance queries) primarily in RAM. With such a configuration, the performance of graphing system 220 has proven superior than disk-based computation systems such as conventional databases.

In various embodiments, graphing system 220 includes four software components including two C++ components, and two Java components. In other embodiments, other architectures are envisioned. The C++ components includes a portion that solves social distance queries using the RAM, utilizing a memory efficient graph implementation, as will be discussed below. Additionally, the C++ components includes a daemon process that reads commands and write results to a socket (or other transport medium). By having graphing system 220 respond to relationship queries via a socket, different implementations of the server interface, may be easily used, without touching the C++ components.

In various embodiments, the server interface, i.e. java components, includes a java class that provides APIs to requesting servers, such as server 200. The API's serve as the interface layer to the C++ components. Additionally, the java components includes an interface layer that sends requests to the socket and waits for relationship data on the socket.

In implementation, graphing system 220 may be multi-threaded and thus can support simultaneous requests from server 200. Additionally, in cases where server 200 includes one or more servers for increasing scale, standard clustering techniques such as data replication can be used to support simultaneous requests from one or more servers.

In various embodiments, many different types of relationship data can be determined by database 210 and graphing system 220 including, a shortest path between user A and user B (e.g. SOCIAL DISTANCE (A,B)), typically a floating point value reflecting the distance from user A to B; shortest paths between user A and user B, for example through user C and user D, or through user E and user F (returned as an array of paths); what users are within or less than N degrees from user A (less than a N social distance); who is the most connected user in the social network, and the like. Many other types of information are reportable within other embodiments of the present invention. In embodiments of the present invention, database 210 and graphing system 220 may communicate with each other via custom function calls from database 210.

The relationship determined may be filtered and sorted in any number of conventional ways based upon various parameters. Additionally, database 210 and graphing system 220 are enabled to received up-dated relationship data, such as adding a new user/friendship relationship or removing a friendship relationship, and to recompute the relationship data, and the like.

Figure 3A:
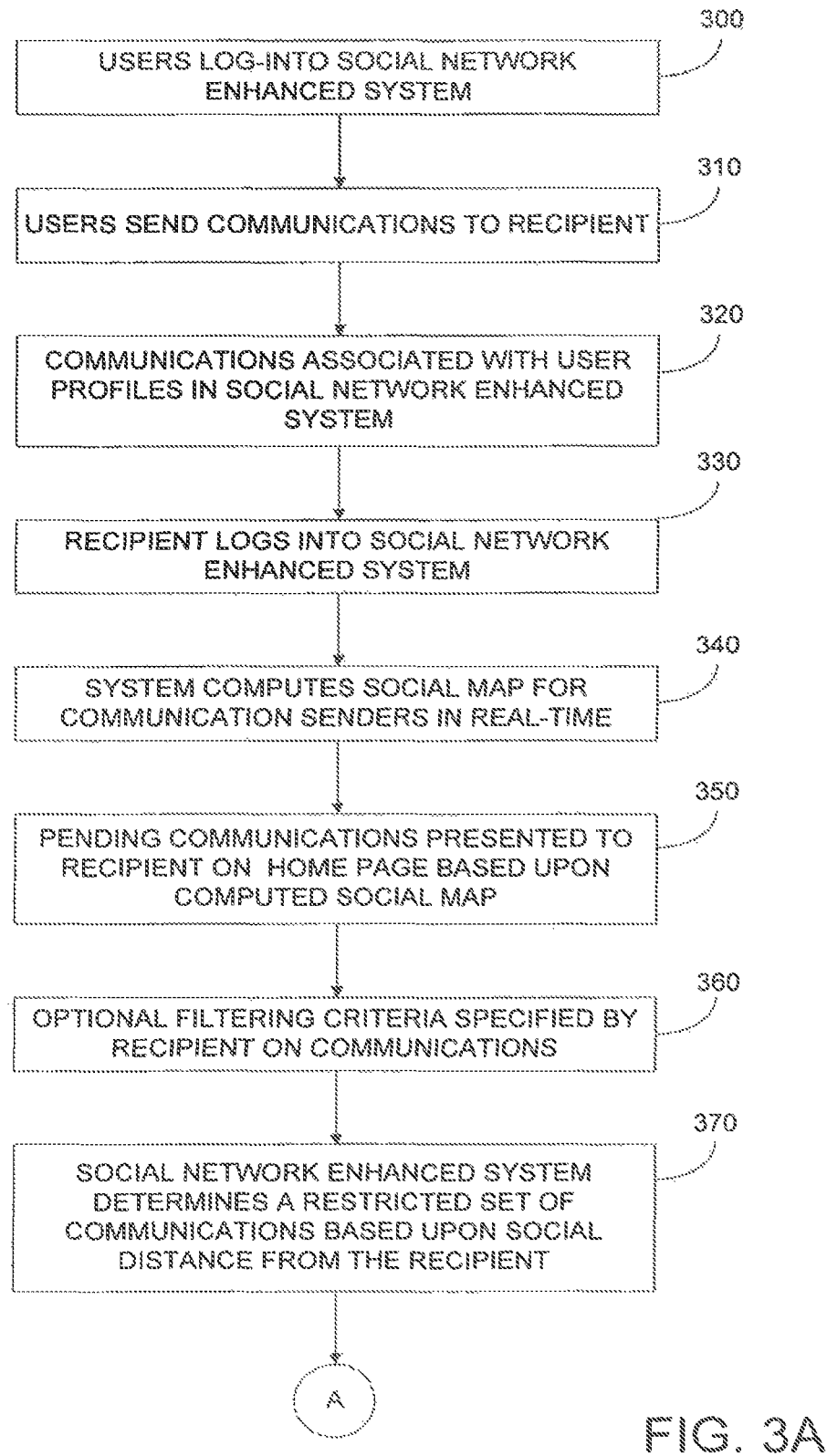
FIGS. 3A-B illustrate a block diagram of an embodiment of the present invention.
Figure 3B:
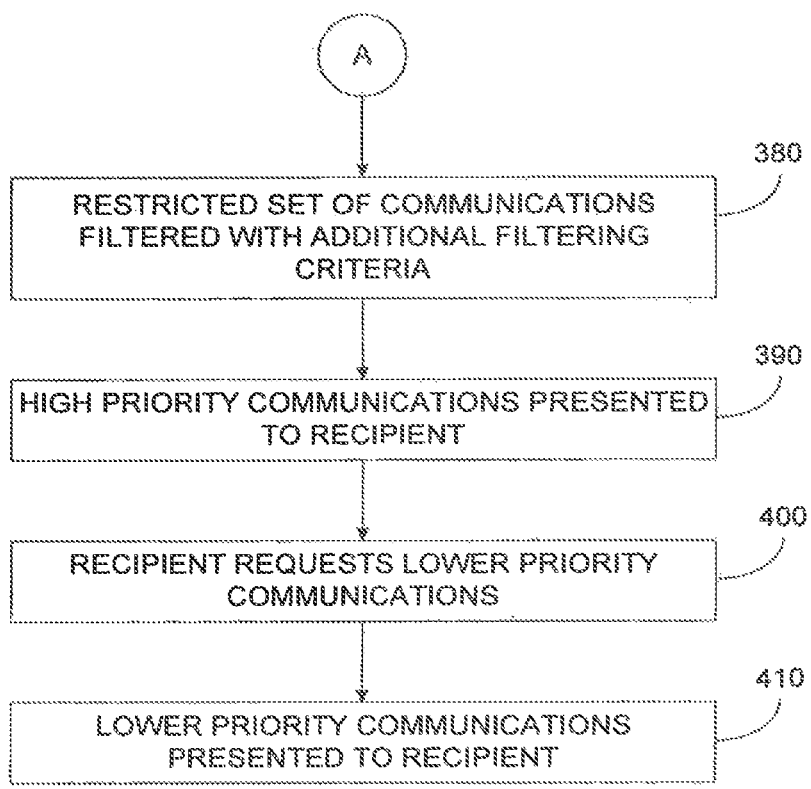

FIGS. 3A-B illustrate a flow chart according to an embodiment of the present invention. More specifically, FIGS. 3A-B illustrate a process of restricting or expand receiving communications, based on trust-based metrics.

Initially, any number of users (e.g. senders) log into the social-network server 200, step 300. Such operations may be done with conventional user name/password combination, or any other level of security. As an option, the sender specify one or more communications to one or more recipients, step 310. For example, in various embodiments, a first user may send an e-mail to one or more recipients, a second user may send a chat message to a recipients, a third user may make an internet call to a recipient, and the like. In various embodiments, a communication server, such as an e-mail server is separate from server 200 and used to process and/or store the communications. In various embodiments, as stated above, the communications may take various forms, such as e-mail messages, IM, SMS, Blog posts, VOIP calls, and the like. The communications are associated with the senders, step 320. In various embodiments, various memory pointers may be used to associate the sender with the communication.

In various embodiments, the user must belong to the social network in order to receive the communications. This is desirable in order to expand the social network and to provide the values for the social networking filtering (e.g. social distance) and any additional filtering criteria for the communications (e.g. geographic location, subject matter). Subsequently, a user (e.g. recipient) logs into the social-network server 200, step 330. In response, in one embodiment, server 200, database 210 and graphing system 220, dynamically performs a social network calculation, and determines a social map for the recipient, step 340. As discussed above, in various embodiments, the social map may include a limited number of users, typically users who are within a pre-determined social distance from the recipient. For example, the pre-determined social distance may be a number, such as 3.5, 2.0, or the like. In another embodiment, the social map may include a fixed number of users, such as 50 of the closest (via social distance) users. In still other embodiments, combinations of the above may be used. For example, a displayed list may include users within a social distance of 1.5 but limited to the first 20 or the closest 20. As discussed in the referenced application above, this calculation can be performed in real-time.

In the various embodiments, the potential recipient is automatically presented with their home page, step 350. The home page may include a set or sub-set of users (e.g. friends) in the social map, the on-line/off-line status of those friends, and the like. Other options/features on their home page may include adding/deleting members to a social network, adding/deleting affinity group memberships, changing the user's profile card, viewing recommendations, sending/receiving e-mail messages, and the like.

In various embodiments, the social map determined in step 340 may include users at a greater social distance than is presented to the user in step 340. For example, the social map may be determined to social distance of 8, however, on the user's home page, friends at a social distance of 2 or less are only displayed. As another example, the social map may include the 100 closest friends, however, on the user's home page, only the top 10 friends (i.e. 10 users with the smallest social distance) are displayed.

In one embodiment of the present invention, one option allows the receiver to specify a trust-network metric (e.g. social distance, affinity group) filter for communications, step 350. In other embodiments, the trust-metric filter is pre-determined by the system, and may be overridden by the recipient. As will be discussed below, in various embodiments, a set social distance may be used to limit communications to the receiver. Additionally, another option allows the receiver to specify any number of additional filters on communications, step 360. As will be described further below, these filters may also be used to limit communications to the receiver. In various embodiments, the user may be prompted for a selection of one or more selections in a hierarchy as a filter. For example, the user may navigate to work-related communications sections, "Personal" communications listing sections, and the like.

In various embodiments of the present invention, in response to the communications requests, server 200 blocks or prioritizes the communications requests, step 370. For example, if an e-mail is from a user not within the recipients social map, the e-mail is blocked, is put into a special e-mail folder (e.g. "potential spam" folder), is placed at the bottom of the e-mail inbox, or the like. Further, if an e-mail is from a user in the recipients social map, the e-mail may be placed at the top of the e-mail inbox.

In other embodiments of the present invention, server 200 may filter/prioritize communications based upon specified affinity groups. As an example, a recipient may specify receiving IM messages from users only within a particular affinity group, for example from users in a "new parent" affinity group, but not receiving communications from users in an "AARP" affinity group, for example. In some cases, the affinity groups may be groups the user is a member of, however, in other cases, the user need not be a member of the affinity groups to. In some embodiments, affinity groups may be organized in a hierarchy, accordingly, the social distance may be generated that specifies how far apart two affinity groups are. For example, a top-level affinity group may be "raising children" group and two lower-level affinity groups may be "teens," and "toddlers." If the user specifies that she can receive communications from the "raising children" group members, she may also receive e-mail messages from "teen" group and "toddler" group members.

In other embodiments, communications from users not within in the recipient's map may be promoted; communications from users greater than a determined social distance (e.g. 2) away are promoted; communications from users further away from a predetermined number (e.g. 500) of closest users are promoted, and the like. Such embodiments are believed useful if the user wants to expand their social network, hear from long lost friends, draw from "outside the box," or the like.

In various embodiments, the additional filtering criteria from step 360 may also be used to filter/prioritize communications to the user, step 380. Many types of limitations may be used to filter-out communications, for example, geographic area of the sender, age of the sender, whether the sender is an individual or a group (e.g. company), and the like. In light of the present patent disclosure, it is believed that one of ordinary skill in the art would recognize that many different criteria may be used as filters in embodiments of the present invention.

In response to the trust-metric filters, and additional filtering criteria, communications are provided to the recipient, step 390. As a result, communications that are relevant to the recipient (via filters) and from "trust-worthy" sources (e.g. users with low social distance from the user) are provided. Further, communications that are less relevant to the recipient (filtered-out) from less known sources (e.g. users with higher social distance from the recipient) are not provided to the recipient.

In another embodiment, incoming communications are automatically prioritized and placed into a series of directories by the system. In this embodiment, each directory may be associated with one or more social distance from the user. For example, one directory includes communications (e.g. e-mails) from closer friends (social distance=1-2); one directory includes communications (e.g. e-mails) from intermediate friends (e.g. friends of closer friends, social distance=2-4); and the like. In such embodiments, a recipient can easily select the communications directory she is most comfortable with to view. In one example, communications (e.g. e-mails) from closer friends may automatically be provided to the recipient. Additionally, if the user wants to go beyond this group, the user may select one or more directories that store communications (e.g. e-mails) for intermediate friends, or further, step 400. In response, communications (e.g. e-mails) of such users are then provided, step 410.

In other embodiments, communications are automatically placed into another series of directories by the system based upon affinity group membership. Accordingly, a recipient can select directories of affinity groups the user is a member of, or an affinity group the user is not member of, but may be relevant. In various embodiments, affinity groups may have a hierarchal organization, accordingly, particular affinity groups may be more closely related to each other than two randomly selected affinity groups. In such cases, the affinity groups that are more closely related to the recipient's affinity group may be prioritized ahead of other groups when presented to the user.

In various embodiments of the present invention, fees could be charged for access to certain communications. For example, certain affinity groups may charge users to be sent weekly newsletters, or the like. As another example, an affinity group may be similar to a "matchmaking club" and have fees for members to receive information of potential candidates. In another example, the affinity group may be a company, and subscription fees are required to receive User's Group information on a product, and the like. In such cases, such communications may be placed in a folder that is indicated as a "paid for" communications, or prioritized for the recipient, or the like. Fees may also be required for being sent communications regarding goods, services, jobs, auctions, or the like.

The inventors of the present invention believe this combination of communications in combination with social network filtering enhances the relevance of communications reaching the recipient. For example, unsolicited communications (e.g. e-mail, phone call) from senders a high social distance away are lowly ranked or deleted because of the high chance these communications may be spam.

Figure 4A:
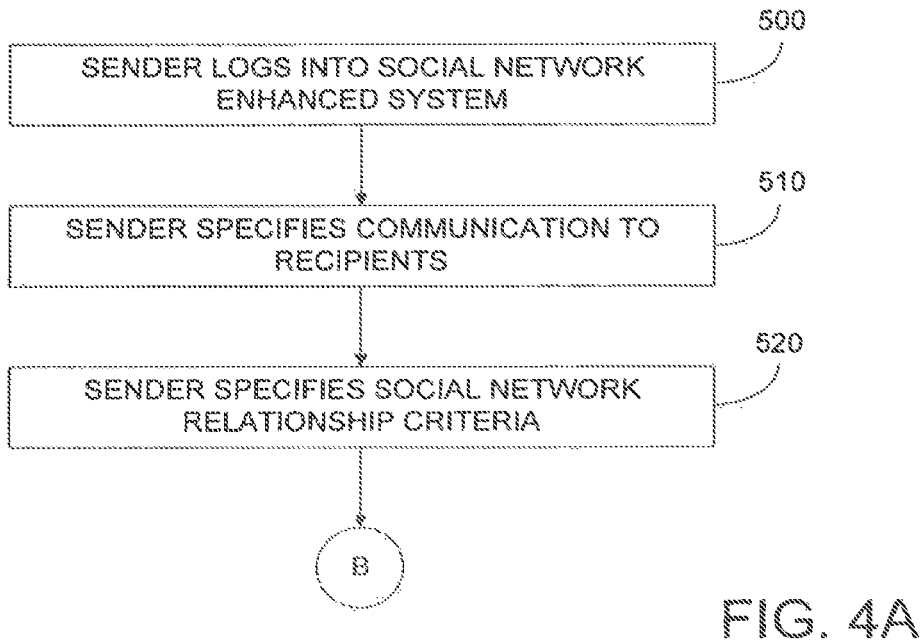
FIGS. 4A-B illustrate another block diagram of an embodiment of the present invention.
Figure 4B:
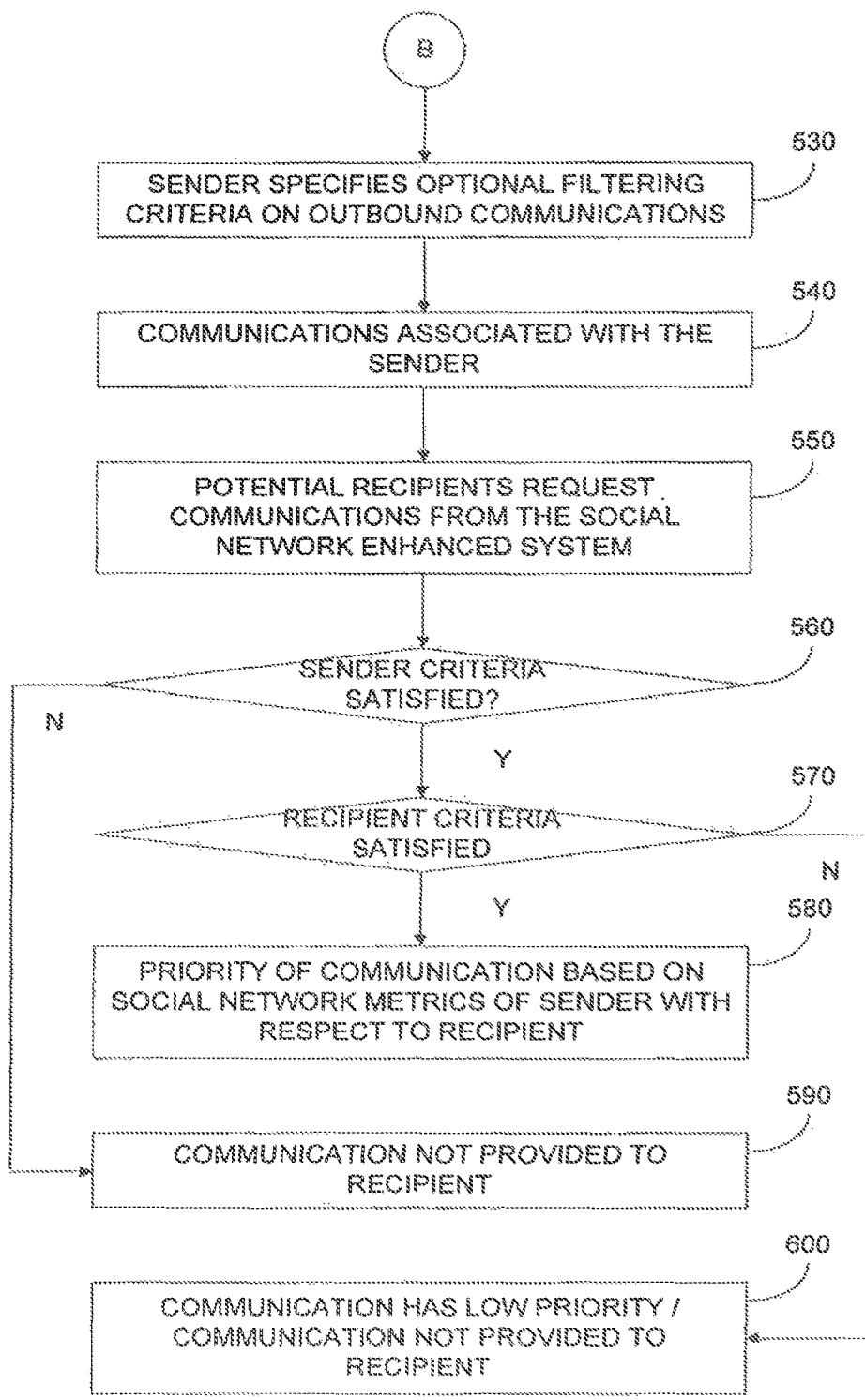

FIGS. 4A-B illustrate a flow chart according to an embodiment of the present invention. More specifically, FIGS. 4A-B illustrate a process of a communication sender restricting the sending of communications.

In embodiments of the present invention, different ways to restrict the sending of communications, such as e-mail messages, invitations, chat messages, are disclosed.

Initially, a user logs into the social-network server 200, step 500. Such operations may be done with conventional user name/password combination, or any other level of security. As an option to the user (individual, business, group, etc.), the user sends one or more communications, step 510. In various embodiments, an e-mail server, or the like is separate from server 200 and is used to store the communications. In various embodiments, the communications include e-mails, SMS messages, IM messages, Blog posts, and the like. In some embodiments of the present invention, one or more recipients may be targeted, and in other embodiments, (e.g. updating of web pages, Blog posts) subscribers to RSS feeds, for example are targeted.

In some embodiments of the present invention, users who send communications to groups of recipients may also specify criteria for the communication based upon relationships defined in the social network, step 520. In one embodiment, the sender specifies a maximum social distance away (from the user) where the communication can be sent. Accordingly, users who are within the maximum social distance may receive the communication, whereas users who are outside the maximum social distance are not sent the communication. For example, a user may specify that an e-mail invitation for a party will be available only to users that have a social distance of two or less.

In other embodiments of the present invention, senders may specify that communications are only sent to members of a specified tribe or affinity group or closely related one. For example, a user may specify that an e-mail invitation for a bass fishing tournament will be available to users in a "bass fishing" tribe, and possibly a "fly fishing" tribe. These embodiments are believed beneficial to the sender, because by limiting the reach of the communication, it is less likely that the sender will be accused of "spamming" others in the social network.

In embodiments of the present invention, providing limitations on the ability of communications (e.g. e-mail messages) to be initiated or forwarded to users greater than a specified social distance away may be particularly useful in limiting the amount of e-mail worms or viruses that get transmitted across the web. With embodiments of the present invention, if social distance is used as a metric, a certain set of e-mail messages cannot be sent as the social distance may be too far away.

In other embodiments of the present invention, the sender may specify other types of limitations may be also used to limit or target a communication, for example, geographic area (e.g. San Francisco Bay Area, Boston Area, 50 miles from Chicago), age, demographic (e.g. male, female, income, home owner), family status (e.g. married, divorced, married with children), and the like, step 530. In light of the present patent disclosure, it is believed that one of ordinary skill in the art would recognize that many different types of criteria may be applied to embodiments of the present invention.

In other embodiments, the sender may, in addition, or alternatively to above, specify that communications are sent to users having a social distance further away from a specific distance. For example, a corporate user may want to get "fresh blood" into the organization, and thus send e-mail messages to users greater than a social distance of 2 away; and at the same time, a recipient may be looking for jobs outside their industry, thus only desire to receive e-mail messages about jobs from senders greater than a social distance of 3 away, or the like. Other similar situations are imaginable with respect to other types of limitations, such as geography, affinity group, and the like.

In various embodiments, fees may be charged to the sender based upon social distance, affinity group, or the like. For example, for free, the sender may make send the communication to users a specified social distance of one away (i.e. immediate friends), members of the same affinity group as the user, users within a particular geographic area, and the like. If the user is willing to pay a fee, the user may make send a communication to users outside the "free" posting area. For example, the communication may be sent to users within a social distance of three, but the communication may be sent to users within a social distance of up to six for a fee. In another example, for a fee, the communication may be available to users, in a wider geographic area, to a larger number of related-affinity groups, and the like.

In additional embodiments, it is contemplated that recipients may themselves recommend or forward communications to other users. For example, a first user may view an e-mail about a job and forward the e-mail to a second user who may be looking for a job. The second user may also forward the e-mail to another user, and so on. In embodiments of the present invention, limits may be applied to whom a user may forward communications to, to avoid "spam" problems with repeated and mass forwarding of communications. As an example, recipients of e-mail messages may be limited to forwarding them only to users of a social distance of one, two or the like away.

In addition, in some embodiments, senders may also limit the forwarding of their communications to other users. For example, a sender may specify that a confidential e-mail message cannot be sent to users having a social distance greater than 1, accordingly recipients of the confidential e-mail may not forward the e-mail to other recipients. From a receiving end, the recipients who received of communications may decide to filter-out forwarded or recommended communications from users greater than a specified social distance away (e.g. three or greater.)

In other embodiments, a poster may compensate or pay fees for recipients to forward communications to other users. For example, a corporate "head-hunter" may send an e-mail including a job listing, and a first recipient may view the e-mail and forward it to a second recipient. If the second user is fit for the job and hired, the head-hunter may pay a referral fee to B. This process may be termed "Pay It Forward" enables bounties to be paid to participants in the communication chain leading to fulfillment. Embodiments may be paid for a product being sold, a person being hired, an apartment being rented, or the like. In other embodiments, simply forwarding the communication to another user itself may trigger some sort of compensation. Types of compensation can include monetary payment, user access to protected content (e.g. articles, music, film clips), coupons, membership, or the like.

In various embodiments of the present invention, the communication along with the desired social network filtering criteria, as well as additional filtering criteria are stored and associated with the poster, step 540.

In various embodiments, when a subsequent user is on-line, step 550, the system determines when the social network criteria, the filtering criteria, and/or the forwarding limitations of the communication sender are initially satisfied, step 560. This may also include a numerical number, such as the closest X number of users, e.g. 5,000 most relevant recipients, etc. If not, the communication is not provided to the subsequent user, step 590.

In various embodiments, the system then determines whether the communication meets the recipients filtering criteria, as was described above, step 570. If so, the communication may be provided to the recipient, step 580. As can be seen, criteria of the sender and receiver should be satisfied before the communication occurs. As examples, a poster may send an e-mail about post a job listing for a programmer to users within a social distance of three, with a forwarding maximum social distance of five. Further, a job hunter may look for programming jobs from senders a maximum social distance of two away. If a social distance from the sender to the recipient is four, the recipient may not see the e-mail job listing unless it is forwarded to her; if the social distance from the recipient to the sender is three, the receiver may not see the e-mail job listing; if the social distance from the sender to the recipient is three, and the social distance from the recipient to the poster is two, the recipient may see the job listing; and the like.

In the illustrated example, if the recipient's criteria are not met, the communication is not provided to the recipient, step 600. In some cases, the communication may, instead, be placed in a lower priority folder. The recipient may subsequently request to view the communication at a later time.

In additional embodiments, communications can be specifically targeted by senders to recipients or affinity groups based upon demographic criteria, affinity data, and the like. Similarly, recipients can explicitly state the types of specific communications they are receptive to receiving, by specifying an interest, joining a group or affinity group relevant to the specific advertisements. The combination of these features allows advertisers to target highly relevant communications to receptive recipients, such as e-mail advertisements, or the like.

In embodiments of the present invention, combining communication targeting with "Tribe Mapping," discussed above, it is believed that senders can more easily determine potentially interested recipients. In various embodiments, a sender may identify a target tribe based upon explicitly identified or implicitly determined interests of the users; a sender may identify a target based upon the Tribe Mapping; a sender may identify key words and in returned, have a tribe identified; or the like. In some embodiments of the present invention, a issue arises, however, if a sender is trying to send e-mail to 10,000 wine enthusiasts, however the Wine Tribe includes only 1,000 users. In this case, by finding closely related tribes to the Wine Tribe, based upon user membership, the remaining 9,000 recipients may be identified. For example, closely related tribes could include a "Gourmet Food Tribe," "Resort Living Tribe," and the like. Although not all members of the related tribes may be interested in wine, by providing such e-mail messages to members of related tribe members in the Tribe Mapping is believed to give better results than spamming random members. In various embodiments, the sender of the communication (e.g. e-mail message) will typically have a social distance computed with regards to potential recipients. Accordingly, it is typically possible to specify a specific number of closest users, via social distance, e.g. 1,000 closest, 5,000 closest, 9,874 closest users, and the like. In some cases, the closest users are within a single affinity group.

In additional embodiments of the present invention, additional factors may be used, in step 380 and 530, above. In various embodiments, "reliability," "feedback," "reputation," "star rating" factors, or the like may be specified. These reliability factors may be based on any number of criteria, such as reliability in responding to questions, in delivery of goods or services, in quality of services, in timeliness of response, in satisfaction, in length of membership, amount of time in business, forum participation and behavior, and the like. These reliability factors, alone, are often not trusted by recipients. The inventors believe this is because recipients do not know whether the opinions are trustworthy or not (i.e. ratings by shills). Accordingly, the addition of social network criteria help provide the recipient with a trust-metric to enable them to make more informed decisions. Because each recipient has their own unique social map, the social distances of the raters of a sender tend to be unique.

In various embodiments, the trust-metric (e.g. social distance) may be a value that is independently presented to the recipient, along with the rating value. For example, a recipient may see e-mail messages from a first sender at a social distance of 3 with a rating of 4/5 and a second sender at a social distance of 4 with a rating of 5/5. In other embodiments, the trust-metric value and the rating value may be combined in any number of ways to provide a single value. For example, the single value may be a simple average of the rating and trust-metric value, a weighted combination, a non-linear combination, or the like. In the example above, the combined value for the first sender may be 3, and the combined value for the second value may also be 3.

As examples of embodiments of the present invention, an implementation of the above social networking overlay could be implemented in conjunction with communications from e-commerce sites, such as an auction site such as ebay.com, amazon.com, or the like. In such embodiments, reputations or rating of the buyers and sellers can be adjudged based upon feedback from prior sellers and buyers, respectively, and now also based upon 1) social distance of the raters and/or 2) social distance of the buyer or seller in question. As examples of the first case, a recipient may be inclined to receive communications from a small, high-rated seller with raters at a social distance of 2.1 away rather than communications from a higher-rated seller with raters at a social distance of 6.4 away; or the like. As examples of the second case, a first sender is at a social distance of 2 from a recipient, and a second sender is at a social distance of 3 from a recipient. If the first sender has a 4 star rating, and the second sender has a 3 star rating, the first sender will be ranked ahead of the second sender; if the first sender has a 2 star rating, and the second sender has a 4 star rating, the second sender may be ranked ahead of the first seller; and if the first sender has a 3 star rating, and the second sender has a 3 star rating, the first sender may be ranked ahead of the second sender; or the like. Then, based upon the rankings, communications from the senders can be prioritized.

In various embodiments of the present invention, a user's profile can be augmented by data that is available on other social networks and portals. Reliability or trust of the user can thus be obtained from a number of domains. For example, a user may have an excellent forum rating because of the user's timeliness and usefulness of postings. This information can be used in the context of communications. For example, a potential buyer may base their buying decision on the user's forum reputation, as a proxy for the classified listing reputation. The inventors believe this solution solves a problem with sender ratings on sites such as e-Bay, because new senders with little transaction history are at a disadvantage compared to e-Bay volume sellers (e.g. businesses.) Accordingly, using a proxy for trustworthiness provides a more level playing-field for individuals to penetrate such "power law" reputation networks (where power becomes more concentrated in the first movers).

In various embodiments, data from other domains may be imported or linked to the user's profile. As an example, a user's e-Bay seller rating may be made available on her profile by either importing that value, or by an external link to such content. This aggregation of social information from a collection of separate locations can give others a better idea of the user's social standing. For example, the data may include tribe membership, interests, blog posts, forum ratings, seller ratings, buyer ratings, philanthropic donations, memberships in external organizations (e.g. WWF, IEEE, Mensa), and other external content (e.g. Amazon Wishlist). In various embodiments, a reputation rating of a sender of a communication may thus be determined upon the user's, e-bay seller rating, Amazon seller rating, e-pinions forum reputation, and the like.

In embodiments of the present invention, another novel concept is that the relationship data of users stored in the social network may be exported to many different applications, such as genealogy, organization history, leadership charts, or the like. Further, the user relationship data may also be exported to different social networks, or the like. In other embodiments of the present invention, the user relational data may be imported into social networks, such as customer lists, or other application or service that stores identity information. In general, the user's profile and social relationships can be distilled into a flat file outside of the social network, portal, or the like, that can be "carried around" by the user and can be controlled by the user. Additionally, embodiments allow the user to unify aspects of the user's identity in one or more files in a single location, whereas previously, the user's identity was distributed in multiple locations, such as yahoo!, eBay, or the like. In one embodiment, the user's profile is described in a format termed FOAF (Friend of a Friend), a flat XML document, including RDF descriptions of ontologies.

In various embodiments, users may automatically be sent invitations to register in the social network via conventional e-mail. These e-mail messages allow a user to simply register via a reply e-mail, unlike current web-based registration schemes. In the reply e-mail messages, users may provide their own social map by simply entering names and/or e-mail address of their friends. Again, in contrast to conventional systems where users must register in a web site via any number of forms, embodiments allow users to simply register via e-mail messages.

In other embodiments of the present invention, other types of data other than communications or posts may be restricted or prioritized based upon trust-metric criteria. In one example, the social networking factors could be implemented in conjunction with search engines such as Yahoo, Google, MSN search, and the like. In some embodiments, clicks on links by previous users may be combined with the trust-metric values to determine a priority for search results. For example, a first user is a member of an affinity group such as an "toy airplane affinity group," and a second user is a member of a "fashion affinity group." If the first user searches for the terms "model" and "photography," the search engine may initially identify a number of search result links. Subsequently, based upon selected search result links of other members in the same "toy airplane affinity group," the search engine will promote links about "hobby supplies," "macro photography," "aviation" and the like, for the first user. In contrast, if the second user searches for the same terms "model" and "photography," the search engine may again identify the same number of search result links. However, based upon selected search result links of other members in the "fashion affinity group," the search engine may promote links about "photographic supplies," "fashion models," "weight loss supplements" and the like, for the second user.

As another example, a search engine may prioritize results based upon prior searches performed by users closer than a determined distance away from the user. For example, a college student may search for "airlines" and "hotels." In such embodiments, the search engine may identify potential links to return to the student, then, based upon searches performed by users less than a social distance of two away, for example, the college student's results may be prioritized. If many of the student's friends are planning trips to Ft. Lauderdale, the search results may prioritize links describing "Spring Break packages to Florida," "Miami nightlife guides" "tanning salons" and the like.

In light of the present disclosure, one of ordinary skill in the art will recognize that many other types of collaborative filtering techniques may be advantageously adapted with the trust-metric factors described above.

In other embodiments of the present invention, users need not log into the social network, but instead may receive communications through subscriptions to listing feeds via RSS, or the like. Other methods for syndication of listings to other networks and providers are contemplated, for example cell phone networks, PDA and/or pager networks, and the like. As other examples, embodiments may be applied to peer to peer communications where feeds, subscriptions, and queries flow through a chat or P2P clients without a portal in the middle. In such embodiments, users may specify one or more subscriptions that include a persistent search via RSS, subscriptions that monitor one or more channels for any data, or the like. In response, when the one or more feeds include data satisfying the search, or when data is posted on the channel, the respective data is provided to the user. For example, a user may specify a search such as, "apartments in Mountain View" which searches a real-estate feed, or may specify monitoring a channel titled "Mountain View apartments."

Generally, embodiments allow for portal-less communication and commerce transactions from device to device, or peer to peer, without having to visit an intervening portal. In such embodiments, users may post communications to the "network of listening devices" and users may view communications with a "listening device" both without central portal (e.g. Craigslist.org, ebay.com).

In various embodiments of the present invention, any combination of the above techniques is contemplated. Further, in embodiments, the results displayed to the user may be non-prioritized, or may be prioritized based upon the filtering criteria. For example, communications may simultaneously be presented to a user/recipient via folders or via position in a hierarchy listing based upon social distance, based upon affinity, reliability, and the like. In various embodiments, when a social networking filter is applied to user recommendations (for example, users who are rating a service provider, such as a plumber), recommendations from a user's social network can be highlighted to the user. For example, if several friends have recommended the same plumber, that plumber may appear as a "recommendation from my social network" to the user. As another example, social network metrics, such as a social distance, and a poster rating may be used with or without using additional filtering criteria, for both senders and potential buyers. As another example, in various embodiments, prioritization of communications may be based upon the type of poster. Accordingly, any of the embodiments described herein are not exclusive of each other.

In additional embodiments, identity of the poster/sender may have an effect on the prioritization of the communication. For example, in general, anonymous senders may have a lower priority than a group senders (e.g. business, affinity group), and a group sender may have a lower priority than an individual sender. Thus for example, if a user receives job listing e-mails three different senders, if the social distances are the same, the e-mail of the individual sender should be higher priority than the e-mail of the group sender, which in turn should be higher priority than the e-mail of the anonymous sender. As another example, if the social distance from the anonymous sender to the receiver is shorter than the social distance from the group sender, which in turn is shorter than the social distance from the individual sender to the receiver, the priorities may be different from the example above. For example, in various cases, depending upon the weighting of the social distance and sender priority, the e-mail from the group sender may be prioritized over the e-mail from the anonymous sender communication; the e-mail of the anonymous sender may be prioritized over the e-mail of the individual sender, the e-mail of the individual sender may be prioritized over the e-mail of the group sender, and the like. In various embodiments, default weightings may be set, which may be overridden by the recipient. For example, a recipient may prefer to hear from group senders rather than individual senders for a recipient's wholesale business, or the like.

Embodiments of the present invention may be applied to any number of communication embodiments. For example, embodiments may be used in conjunction with any on-line shopping search system such as froogle.com, mysimon.com, or the like. In addition, embodiments may be used in conjunction with on-line shopping rating system such as epinions.com, bizrate.com, or the like. Embodiments may also be based upon brick-and-mortar shopping systems, such as registry services provided by stores, and the like. The above embodiments may also be applied to on-line merchants such as amazon.com, bn.com, overstock.com and the like. Additionally, as discussed above, embodiments may be applied to auction sites such as ebay.com, and the like. Accordingly, the concepts disclosed above are extremely valuable in a variety of applications, such as interactive "yellow pages" and directories of products and services (e.g. Thomas Register, Martindale-Hubbell), and the like.

In the embodiments disclosed above, and in the claims below, reference is made as to the trust relationships between two users, however, it should be understood that the trust relationships can span more than two users. For example, in value chains including multiple users, such as a seller, a value added reseller, and a buyer, the trust relationships of each party is important. This is even more significant for more complex value chains with multiple participants.

Further embodiments can be envisioned to one of ordinary skill in the art after reading this disclosure. In other embodiments, combinations or sub-combinations of the above disclosed invention can be advantageously made. The specification, accordingly, is to be regarded in an illustrative rather than a restrictive sense. It will, however, be evident that various modifications and changes may be made thereunto without departing from the broader spirit and scope of the invention as set forth in the claims.

What is claimed is:

1. A method for automated prioritization of electronic communications transmitted over a network, the method comprising:
   receiving, on a server using an interface communicatively coupled to the network, an electronic communication directed to a first user of a social network from a second user of the social network, the social network including affinity groups configured within the social network;
   determining, using one or more processors within the server, a user network of the first user within the social network, the user network of the first user including users and affinity groups that are within a predetermined social distance from the first user;
   determining if the second user is within the user network of the first user; and
   prioritizing presentation of the electronic communication, relative to a plurality of other electronic communications for the first user, based at least in part on the determining if the second user is within the user network of the first user.

2. The method of claim 1, wherein prioritizing presentation of the electronic communication further includes:
   enabling the presentation of the electronic communication to the first user when the second user is within the user network of the first user; and
   blocking the presentation of the electronic communication to the first user when the second user is not within the user network of the first user.

3. The method of claim 1, further comprising:
   constraining information searches requested by the first user to information from users within the user network of the first user.

4. The method of claim 1, further comprising:
   imputing relationships of users within each affinity group to the respective affinity group for calculating distances between affinity groups and for calculating distances between users and affinity groups.

5. The method of claim 4, wherein the second user is within the user network of the first user further when:
   a social distance between the first user and the second user is less than or equal to the predetermined social distance; or
   a social distance between affinity groups of the first user and affinity groups of the second user is less than or equal to the predetermined social distance.

6. The method of claim 4, further comprising:
   determining a taxonomy for related affinity groups based on common user membership overlap.

7. The method of claim 1, further comprising:
   identifying implied affinity group s for the first user, wherein an implied affinity group includes users that share a common expressed interest, wherein the implied affinity groups for the first user are included within the user network of the first user;
   identifying implied affinity group s for the second user; and
   wherein determining if the second user is within the user network of the first user includes the implied affinity groups.

8. The method of claim 1, further comprising:
   determining a trust-network metric associated with the second user, wherein prioritizing presentation of the electronic communication includes weighting the trust-network metric associated with the second user in comparison to trust-network metrics associated with the plurality of other electronic communications for the first user.

9. The method claim 1, wherein prioritizing presentation of the electronic communication includes storing the electronic communication in a folder associated with an affinity group connection between the first user and the second user.

10. A system comprising:
a network interface;
a memory device; and
a processor communicatively coupled to the memory device, wherein the processor, the memory device, and the network interface cooperate such that the system performs operations comprising:
receiving, on the network interface, an electronic communication directed to a first user of a social network from a second user of the social network, the social network including affinity groups configured within the social network;
determining, by the processor, a user network of the first user within the social network, the user network of the first user including users and affinity groups that are within a predetermined social distance from the first user;
determining if the second user is within the user network of the first user; and
prioritizing presentation of the electronic communication, relative to a plurality of other electronic communications for the first user, based at least in part on the determining if the second user is within the user network of the first user.

11. The system of claim 10, wherein prioritizing presentation of the electronic communication further includes:
enabling the presentation of the electronic communication to the first user when the second user is within the user network of the first user; and
blocking the presentation of the electronic communication to the first user when the second user is not within the user network of the first user.

12. The system of claim 10, wherein the operations further comprise:
constraining information searches requested by the first user to information from users within the user network of the first user.

13. The system of claim 10, wherein the operations further comprise:
imputing relationships of users within each affinity group to the respective affinity group for calculating distances between affinity groups and for calculating distances between users and affinity groups.

14. The system of claim 13, wherein the second user is within the user network of the first user further when:
a social distance between the first user and the second user is less than or equal to the predetermined social distance; or
a social distance between affinity groups of the first user and affinity groups of the second user is less than or equal to the predetermined social distance.

15. The system of claim 13, wherein the operations further comprise:
determining a taxonomy for related affinity groups based on common user membership overlap.

16. The system of claim 10, wherein the operations further comprise:
identifying implied affinity groups for the first user, wherein an implied affinity group includes users that share a common expressed interest, wherein the implied affinity groups for the first user are included within the user network of the first user;
identifying implied affinity groups for the second user; and
wherein determining if the second user is within the user network of the first user includes the implied affinity groups.

17. The system of claim 10, wherein the operations further comprise:
determining a trust-network metric associated with the second user, wherein prioritizing presentation of the electronic communication includes weighting the trust-network metric associated with the second user in comparison to trust-network metrics associated with the plurality of other electronic communications for the first user.

18. A non-transitory computer-readable medium including instructions for automated prioritization of electronic communications transmitted over a network that, when executed on a computing device including one or more processors, cause the computing device to perform operations comprising:
receiving, on a server using an interface communicatively coupled to the network, an electronic communication directed to a first user of a social network from a second user of the social network, the social network including affinity groups configured within the social network;
determining, using one or more processors within the server, a user network of the first user within the social network, the user network of the first user including users and affinity groups that are within a predetermined social distance from the first user;
determining if the second user is within the user network of the first user; and
prioritizing presentation of the electronic communication, relative to a plurality of other electronic communications for the first user, based at least in part on the determining if the second user is within the user network of the first user.

19. The computer-readable medium of claim 18, wherein prioritizing presentation of the electronic communication further includes:
enabling the presentation of the electronic communication to the first user when the second user is within the user network of the first user; and
blocking the presentation of the electronic communication to the first user when the second user is not within the user network of the first user.

20. The computer-readable medium of claim 18, wherein the operations further comprise:
constraining information searches requested by the first user to information from users within the user network of the first user.

21. The computer-readable medium of claim 18, wherein the operations further comprise:
imputing relationships of users within each affinity group to the respective affinity group for calculating distances between affinity groups and for calculating distances between users and affinity groups.

22. The computer-readable medium of claim 21, wherein the second user is within the user network of the first user further when:
a social distance between the first user and the second user is less than or equal to the predetermined social distance; or
a social distance between affinity groups of the first user and affinity groups of the second user is less than or equal to the predetermined social distance.

23. The computer-readable medium of claim 21, wherein the operations further comprise:
   determining a taxonomy for related affinity groups based on common user membership overlap.

24. The computer-readable medium of claim 18, wherein the operations further comprise:
   identifying implied affinity groups for the first user, wherein an implied affinity group includes users that share a common expressed interest, wherein the implied affinity groups for the first user are included within the user network of the first user;
   identifying implied affinity groups for the second user; and
   wherein determining if the second user is within the user network of the first user includes the implied affinity groups.

25. The computer-readable medium of claim 18, wherein the operations further comprise:
   determining a trust-network metric associated with the second user, wherein prioritizing presentation of the electronic communication includes weighting the trust-network metric associated with the second user in comparison to trust-network metrics associated with the plurality of other electronic communications for the first user.

* * * * *

UNITED STATES PATENT AND TRADEMARK OFFICE
CERTIFICATE OF CORRECTION

PATENT NO. : 9,807,047 B2
APPLICATION NO. : 15/235367
DATED : October 31, 2017
INVENTOR(S) : Lawler et al.

Page 1 of 1

It is certified that error appears in the above-identified patent and that said Letters Patent is hereby corrected as shown below:

In the Claims

In Column 20, Line 50, in Claim 7, delete "group s" and insert --groups-- therefor In Column 20, Line 55, in Claim 7, delete "group s" and insert --groups-- therefor In Column 21, Line 1, in Claim 9, after "method", insert --of--

In Column 22, Line 39, in Claim 19, after "The", insert --non-transitory--

In Column 22, Line 48, in Claim 20, after "The", insert --non-transitory--

In Column 22, Line 53, in Claim 21, after "The", insert --non-transitory--

In Column 22, Line 59, in Claim 22, after "The", insert --non-transitory--

In Column 23, Line 1, in Claim 23, after "The", insert --non-transitory--

In Column 23, Line 5, in Claim 24, after "The", insert --non-transitory--

In Column 23, Line 17, in Claim 25, after "The", insert --non-transitory--

Signed and Sealed this
Eleventh Day of June, 2019

Andrei Iancu
*Director of the United States Patent and Trademark Office*